Patented May 21, 1940

2,201,459

UNITED STATES PATENT OFFICE 2,201,459

PROCESS FOR SOLIDIFYING EARTH

Jan van Hulst, Amsterdam, Netherlands, assignor to The Patent and Licensing Corporation, New York, N. Y., a corporation of Massachusetts No Drawing. Application April 26, 1933, Serial No. 668,033. In the Netherlands October 28, 1931

6 Claims. (Cl. 61—36)

The invention relates to a process for applying layers, screens or masses impermeable or substantially impermeable to water or gases, in porous and pervious soils, such as sand soils or sand masses, in porous masonry and other stony materials, and/or fixing loose or mobile soils. This application is a continuation in part of my application filed October 24, 1932, Serial No. 639,305.

The process according to the invention essentially consists in that an aqueous dispersion of bituminous substances, such as asphalt, is caused to penetrate into the soil or mass to be treated, and to coagulate at the desired place or at the required depth, so as to produce a firm layer, which is impermeable or substantially impermeable to water and/or gases. In carrying out the process use is preferably made of a dispersion, of which the particle size of the disperse phase is smaller than the pores of the soil layer to be passed through, so that the dispersion may penetrate to the required depth without hindrance.

The process according to the invention may be applied in various manners, some modes of application being mentioned here below by way of example:

When making canals in a porous soil, the difficulty is often experienced, that the water percolates into the sandy soil, as a result of which most of it is lost so that it has to be continuously re-fed. In the case of sluices being built in porous soil, the water diffuses underneath or along the sides of the sluice, thus reducing its effectiveness. Similar losses of water are experienced in the cases of dykes and barrages, where the water can escape through the body of the dyke mainly consisting of sand, and also underneath the dyke, wells being produced on the outside of the dyke. Also in the building technique quite a variety of problems have to be solved, e. g. with respect to the improvement of building grounds, the construction of foundations in insufficiently firm or impervious soils, for example, when making pillars of bridges, canal walls, sluices, landing places, tunnels, etc., the impermeabilization of existing constructions, cellars, etc. In other cases it is desired to reduce the ground pressure against vertical walls, which can be effected by imparting a greater firmness to the soil abutting the wall or by reducing its mobility.

Among other applications of this invention, its use in the oil well drilling practice should also be mentioned. For example, it is a frequent experience, when drilling the wells, to pass through such excessively porous formations that the drilling mud cannot form an impervious mud sheath on the walls of the bore-hole, but penetrates through the porous formation with the result that the loss of circulation is experienced. To eliminate this difficulty, the present method of forming asphalt screens or seals in the zones of such porous strata can be successfully applied.

The process can also be of great value in shutting off the formation waters from entering the bore-holes. The details of carrying out my process in actual practice will be readily understood from the following description.

The process according to the invention affords a method of applying layers or screens which are impermeable or substantially impermeable to water or gases in porous or loose soils or other masses, and/or to impart to the soil a greater firmness or to reduce its mobility even in places which are difficult to attain by excavation, it being in general unecessary in carrying out this process to displace considerable quantities of earth.

This method consists in allowing a suitable asphalt or other bituminous dispersion to penetrate into the soil. After a certain time or at a certain distance from the starting point the dispersion coagulates, whereby the asphalt separated out of the dispersion is deposited in the pores of the soil and forms with the constituents thereof a mass which is impermeable or substantially impermeable to water and gases, or which is fixed.

By a proper selection of the composition of the dispersion, e. g. by a suitable concentration of the disperse phase, the nature of the dispersing agent and the stabilizer etc., it is possible to control the coagulation of the dispersion after a predetermined time and after the dispersion has penetrated a certain distance into the soil. Thus in general a stable dispersion can travel a greater distance in the soil than an unstable dispersion. Also coagulation-promoting agents may be added to the dispersion prior to or at the time of its application, whereby the dispersion coagulates in the soil after a certain time, e. g. after a few days. Either electrolyte solutions or in general coagulation-promoting agents may be applied to the soil before, during or after the introduction of the dispersion, in order to produce a proper coagulation of the latter at the required place. On the other hand the presence of electrolytes in the soil may effect the coagulation of the dispersion, thus making it necessary or advantageous to reduce the concentration of these substances in the soil, which can be done by previous application of pure water or a solution of inversely acting agents, e. g. of coagulation-hindering substances, such as an alkaline solution.

As examples of substances promoting or affecting the coagulation to be added to the dispersion before use may be mentioned esters which are easily hydrolisable, such as methyl formate. By hydrolysis of the latter formic acid is produced, which causes coagulation after a certain time. Coagulation of the dispersion may also be effected by the decomposition or destruction of the emulsifying or stabilizing agents contained in the dispersion. Thus, in the case of a dispersion stabilized with casein, the latter substance will after some time decay in the soil owing to bacterial action, thereby causing the dispersion to coagulate, and the said fouling action may be activated by adding septic substances, such as ditch-mud, to the dispersion. As coagulating agents use may be made also of gases, such as sulphur dioxide, carbon dioxide, chlorine, ammonia, etc., or gaseous solutions, which may be pumped into the soil preferably after introduction of the dispersion.

In general, when applying the dispersion the liquid present in the soil is displaced by the dispersion, and when subsequently applying an electrolyte solution this penetrates into the soil until it reaches the dispersion. The requirements for producing a proper coagulation at the desired depth of penetration may be determined in each given case by experiment.

An important factor in carrying the process into effect is the width of the pores or voids of the soil. In a coarse sandy soil the dispersion will penetrate more easily than in a fine-grained soil. Care should be taken that the particle size of the disperse phase is adjusted to the soil porosity in accordance with the required depth of penetration. A suitable particle size of the disperse phase can be obtained in a known way when preparing the dispersion, and any coarse particles present may be removed by careful screening or filtering. Thus, for instance, the dispersion may, before it is applied, be filtered through a layer of the same material which it will subsequently have to penetrate.

Example I

Taking the case that an undue quantity of water percolating underneath a certain portion of a canal dyke into the surrounding soil; a number of foraminous pipes are drilled into the soil at mutual distances of say 3 m. and through these pipes a 30% asphalt dispersion prepared with a soap solution and 2% of casein (calculated on asphalt) is allowed to penetrate into the body of the dyke. Immediately before applying the dispersion 2% of methyl formate (calculated on asphalt) is added thereto. The quantity of dispersion is so chosen that the masses of soil worked up by the dispersion emanating from the various pipes are contiguous. After a certain time the dispersion coagulates and renders the dyke of the canal locally impermeable or substantially impermeable to water.

Example II

In an analogous manner use is made of a bitumen dispersion prepared as follows: Bitumen is dispersed in an aqueous solution containing 1.5% of potassium oleate and 0.25% of potassium aluminate, to a dispersion having a bitumen content of 35%. To this dispersion is added 1-2% of casein and, directly before it is introduced into the soil, 3% of methyl formate (calculated on bitumen). The formic acid produced in the soil by hydrolysis of the methyl formate reacts with the potassium aluminate under separation of aluminium hydroxide, which is a stronger coagulating agent than formic acid itself. Moreover, the potassium aluminate maintains the medium alkaline, which is advantageous for a rapid saponification of the ester.

Example III

A 50% bitumen dispersion, prepared in known way in a colloid mill with the aid of a 1-5% potassium oleate solution is stabilized by adding 1.5% of casein and thereafter diluted with water to a bitumen concentration of 40%. The dispersion is introduced into the soil in the same way as in Example I, and thereupon gaseous sulphur dioxide is pumped in under a suitable pressure. The sulphur dioxide dissolves in the aqueous phase of the dispersion and causes the latter to coagulate.

What I claim is:

1. A process for making impervious or fixing pervious or loose sub-soil layers, such as sand soils, and other porous masses, which consists in causing an aqueous dispersion of a bituminous substance to penetrate to a predetermined depth into the soil or mass to be treated, and thereafter causing said dispersion to coagulate.

2. A process for making impervious or fixing pervious or loose sub-soil layers, such as sand soils, and other porous masses, which consists in causing an aqueous dispersion of a bituminous substance to penetrate into the soil or mass to be treated, the size of the dispersed particles being as much smaller than the width of the pores or voids of the soil or other porous mass to be treated as is advantageous in order to enable the penetration of the dispersion to the desired depth.

3. A process for making impervious or fixing pervious or loose sub-soil layers, such as sand soils, and other porous masses, which comprises causing an aqueous dispersion of a bituminous substance to penetrate into the soil or mass to be treated, and before, during or after the application of the dispersion applying to the soil or other mass to be treated a solution of a substance such as an electrolyte to promote the coagulation of the dispersion.

4. A process for making impervious or fixing pervious or loose sub-soil layers, such as sand soils, or other porous masses, which comprises causing an aqueous dispersion of a bituminous substance to penetrate into the soil or mass to be treated, said process also including the step of removing from the mass to be treated any excess of substances affecting the coagulation of the dispersion by a previous application of pure water or of an inversely acting solution.

5. A process for making impervious or fixing pervious or loose sub-soil layers, such as sand soils, or other porous masses, which comprises causing an aqueous dispersion of a bituminous substance to penetrate into the soil or mass to be treated, said dispersion being combined with a substance affecting its coagulation whereby to control the time of coagulation of the dispersion penetrated into the soil.

6. A process for making impervious or fixing pervious or loose sub-soil layers, such as sand soils, or other porous masses, which comprises causing an aqueous dispersion of a bituminous substance to penetrate into the soil or mass to be treated, said dispersion having added thereto, before its application, a hydrolizable ester, such as methyl formate.

JAN van HULST.